US012648886B2

(12) United States Patent
Gomez et al.

(10) Patent No.: US 12,648,886 B2
(45) Date of Patent: Jun. 9, 2026

(54) INFLATABLE TRENDELENBURG TRANSFER AND PRESSURE MANAGEMENT APPARATUS

(71) Applicant: INFINITUS MEDICAL TECHNOLOGIES LLC, Holly Springs, NC (US)

(72) Inventors: David J. Gomez, Holly Springs, NC (US); Nathan Winder, San Jose, CA (US)

(73) Assignee: Infinitus Medical Technologies LLC, Holly Springs, NC (US)

( * ) Notice: Subject to any disclaimer, the term of this patent is extended or adjusted under 35 U.S.C. 154(b) by 291 days.

(21) Appl. No.: 18/278,225

(22) PCT Filed: Mar. 20, 2023

(86) PCT No.: PCT/US2023/015641
§ 371 (c)(1),
(2) Date: Aug. 22, 2023

(87) PCT Pub. No.: WO2023/177918
PCT Pub. Date: Sep. 21, 2023

(65) Prior Publication Data

US 2024/0164971 A1 May 23, 2024

Related U.S. Application Data

(60) Provisional application No. 63/321,121, filed on Mar. 18, 2022.

(51) Int. Cl.
*A61G 13/12* (2006.01)

(52) U.S. Cl.
CPC ....... *A61G 13/1265* (2013.01); *A61G 13/128* (2013.01); *A61G 13/127* (2013.01); *A61G 13/1275* (2013.01)

(58) Field of Classification Search
CPC ................ A61G 7/1026; A61G 7/1023; A61G 13/1265; A61G 13/126; A61G 13/04;
(Continued)

(56) References Cited

U.S. PATENT DOCUMENTS

2015/0020316 A1* 1/2015 Khambete .............. B68G 11/03 5/652
2017/0049647 A1* 2/2017 Rigoni .................. A61G 7/001
(Continued)

FOREIGN PATENT DOCUMENTS

DE 102018125734 A1 * 5/2019 ........... A61H 9/0078

*Primary Examiner* — Justin C Mikowski
*Assistant Examiner* — Deborah Talitha Gedeon
(74) *Attorney, Agent, or Firm* — David L. Principe; Sarah M. Grimaldi; Phillips Lytle LLP

(57) ABSTRACT

An apparatus with a high coefficient friction pad and an inflatable base for use in connection with transfer and pressure management. The inflatable base has one or more low coefficient friction areas and has one or more high coefficient friction areas disposed thereon. The base has one or more chambers capable of being disposed in fluid communication with a source of fluid for inflating the base. Inflation of the one or more chambers causes the low coefficient friction areas to contact the surgical table and deflation of the base causes the low coefficient friction areas to be removed from contact with the surgical table and casuses the high coefficient friction areas to contact the surgical table.

20 Claims, 10 Drawing Sheets

(58) Field of Classification Search
CPC .. A61G 2210/90; A61G 1/01; A61G 13/1235; A61G 7/1028; A61G 7/1073; A61G 7/1092; A61G 13/122; A61G 13/1225; A61G 13/127; A61G 13/1295; A61G 2200/32; A61G 7/001; A61G 7/1021; A61G 7/103; A61G 7/1063; A61G 1/013; A61G 1/044; A61G 13/0009; A61G 13/0036; A61G 13/0081; A61G 13/107; A61G 13/108; A61G 13/121; A61G 13/123; A61G 13/1245; A61G 13/1285; A61G 2203/12; A61G 7/065; A61G 7/075; A61G 7/0755; A61G 7/10; A61G 7/1034; A61G 7/1051; A61G 7/1069; A61G 7/1088; A61G 7/109; A61G 99/00; A61G 7/057; A61G 7/05715; A61G 7/05769; A61G 7/05776
See application file for complete search history.

(56) References Cited

U.S. PATENT DOCUMENTS

2018/0311097 A1* 11/2018 Rodzewicz .......... A61G 7/1025
2018/0353360 A1* 12/2018 Kea ........................ A61G 7/065
2021/0361512 A1* 11/2021 Gomez ................. A61F 5/3776

* cited by examiner

INFLATABLE TRENDELENBURG TRANSFER AND PRESSURE MANAGEMENT APPARATUS

CROSS-REFERENCE TO RELATED APPLICATION

The present application claims priority benefit from U.S. Provisional Patent Application No. 63/321,121 filed Mar. 18, 2022, and entitled "Inflatable Trendelenburg Transfer and Pressure Management Device," which is incorporated herein by reference.

TECHNICAL FIELD

The present invention relates generally to the field of medical devices for use in the surgical theater, and more particularly to an apparatus for securing a patient in the Trendelenburg or lateral tilt positions and a method of using such an apparatus to move patients more ergonomically to facilitate a surgical procedure.

BACKGROUND ART

The utility of having high friction surfaces in direct contact with the surgical mattress provides the reinforcement needed to reduce sliding or injury when the patient is placed in a head down or laterally rotated position on the surgical table.

Some workarounds in the industry cause providers to put low friction "hover" or inflatable style patient transfer devices under existing high friction foam Trendelenburg pads, as those systems do not move and are tethered to one specific area of the surgical table. When lithotomy is required, for example, all foam pads are tethered to the lowest station of the mid plate (section) of the surgical table, thus forcing staff to use sheets to move patients by hand or lift sheet. This procedure is due to the fact that modern surgical tables have a middle plate length of 44-45 inches, while the average human sitting height (top of head to sacrum) is 34-36 inches on average. This difference dictates the movements required of staff to move the patient on foam, gel, or high friction pads that do not have any modularity of moveability.

The current instructions for use of existing foam pad systems forces staff to physically lift the entire patient off the high friction surface with a sheet.

Due to these inherent ergonomic risks to surgical staff, there are many "workarounds" employed that can potentially put the patient at risk.

One common workaround is to pre-position patients at the lowest station on the table when lithotomy is required, forcing anesthesia providers to reach to manage the airway. This arrangement is potentially unsafe for the patient, as having proximal control of the anesthesia airway is inherent to the safety of the patient undergoing anesthesia.

One less common workaround is to place an inflatable "hover" style patient transfer device underneath a high friction foam pad. This configuration violates the instructions for use of common foam pads as they must have a direct friction interface with the surgical mattress top, plus the Velcro straps attached to the surgical bedrail. As these foam pads are unreinforced with any fabric, SMS, or similar material, the inherent structure of the pad is reliant on the high friction contact between the pad and the surgical mattress top. Any low friction material placed between the foam pad and the mattress can cause the foam pad to slip. This arrangement puts strain on the four Velcro/material straps that are routinely only sewn or glued to the foam pad. Accordingly, this configuration provides very little structural integrity in the event of shearing or sliding.

All current inflatable products have some material slack between the upper and lower material segments when not inflated, allowing for the top material and bottom material to slide in relation to one another. This slack creates differential sliding between the upper and lower surfaces of the inflatable device. The slack is approximately 1-8 inches depending on design or manufacturer. The combination of this differential sliding within the top and bottom surface of the inflatable transfer device and the risk of sliding between the low friction material of the bottom surface and the top of the surgical table/mattress can create a high risk event of the patient sliding a significant distance while in a gravity-dependent position on a tilted table which could easily result in patient injury or even the potential of death. Accordingly, there is a need for an improved inflatable Trendelenburg transfer and pressure management device.

BRIEF SUMMARY OF THE INVENTION

With parenthetical reference to the corresponding parts, portions or surfaces of the disclosed embodiment, merely for the purposes of illustration and not by way of limitation, the present invention meets the above described need by providing an apparatus with a foam pad and an inflatable base assembly in combination. Also, by providing high and low coefficient friction areas to the bottom of the base that comes into contact with the surgical table, the present invention reduces the number of lateral straps required versus conventional products. Accordingly, the present invention improves the rail space and allows all the products required for surgery to be placed on the rails, e.g., fixed retraction, stirrups, uterine manipulators, and the like.

The apparatus (20) of the present invention provides for moving a patient on a pad (23) and holding the pad (23) in place on the surgical table during omnidirectional tilting of the surgical table, namely Trendelenburg (head down) or lateral tilt.

A pad (23), which may be disposable, works in conjunction with a reusable patient lifting/moving base (32), allowing nurses to more readily and easily move patients on the table in order to facilitate surgical positioning. In another embodiment, the entire apparatus (20) may be disposable. On the table contacting surfaces of the apparatus (20), areas of high friction materials (adhesives, materials, over sprays, etc.) may hold the apparatus (20) in place and prevent slippage between the bottom surface (34) of the apparatus (20) and the top of the surgical table. The apparatus (20) may be used in conjunction with secondary mechanical apparatuses including, but not limited to, straps that affix directly to the surgical table, surgical mattress, table rails, etc.

The improvements allow the apparatus (20) to function in accordance with existing "hover" or inflatable patient transfer devices. However, the design improvement reduces potential clinical risks inherent to placing a low friction surface material underneath a patient positioning device designed to hold a patient in any omnidirectional tilt of the surgical table, namely Trendelenburg and lateral rotations.

In one embodiment of the invention, an apparatus for positioning a patient in a gravity dependent surgical position on a surgical table is provided.

The apparatus (20) includes a base (32) having a top surface (33) and a bottom surface (34). The bottom surface (34) has areas (71), (74), (77), (80), (83) and (86) of high friction materials that are used to inhibit movement of the bottom surface (34) relative to the table/mattress when the table is placed in the gravity dependent surgical position. A high friction coefficient patient supporting pad (23) is affixed to the top surface (33) of the base (32). A plurality of handles (35*a-d*) and (36*a-d*) are configured and arranged such that each handle is attached to the apparatus (20). The base (32), patient supporting pad (23), and any additional material are combined to provide a reinforced pad assembly configured to prevent bunching when lifting or repositioning the patient during surgical table multi-axis positioning changes required during surgery. The high friction material on the bottom surface (34) of the base (32) releases contact with the surgical table, when the patient is slightly lifted via the handles (35*a-d*) and (36*a-d*) to allow for minimal applied force by a user thereby reducing overall load as compared to use of draw sheets and/or by hand. After positioning the patient to the desired location, the friction surfaces on the bottom surface (34) of the base (32) reengage with the surgical table mattress after removal of lifting force on handles (35*a-d*) and (36*a-d*) which keeps the apparatus (20) in place during gravity dependent surgical table positions used during surgery. The base (32), patient supporting pad (23) and any additional materials may be connected to form a unitary disposable combination.

The present invention provides an apparatus (20) for positioning a patient in a gravity dependent surgical position on a surgical table. The apparatus (20) includes a high coefficient friction foam pad (23) having a top surface (26) and a bottom surface (29).

The apparatus (20) also includes an inflatable base (32). The base (32) has a top surface (33) and a bottom surface (34). The top surface (33) is disposed beneath and supports the bottom surface (29) of the foam pad (23). The bottom surface of the base (32) has one or more low coefficient friction areas and has one or more high coefficient friction areas disposed thereon. The base (32) has one or more chambers (90), (93), (96) and (99) capable of being disposed in fluid communication with a source of fluid for inflating the base (32). Inflation of the one or more chambers (90-99) causes low coefficient friction areas (100) to contact the surgical table and deflation of the base (32) causes the low coefficient friction areas (100) to be removed from contact with the surgical table and the high coefficient friction areas (71)-(86) to contact the surgical table.

A plurality of handles (35*a-d*) and (36*a-d*) extend laterally from opposite sides (65, 68) of the apparatus (20).

One or more straps (38*a*, 38*b*) extend laterally from opposite sides (65, 68) of the apparatus (20).

In another aspect, the apparatus (20) further comprises one or more inflatable baffles (102), (105), (108), (111), (114) and (117) in fluid communication with the chambers (90)-(99).

In another aspect, the chambers (90)-(99) are disposed around the periphery of the apparatus (20).

In another aspect, the base (32) further comprises a top layer of material having an outside surface (33) facing outward and an inside surface facing inward and downward toward the surgical table.

In yet another aspect of the invention, the base (32) further comprises a bottom layer of material having an outside surface (34) facing the surgical table and an inside surface facing upward toward the top layer.

In another aspect, the inside surface of the top layer of the base (32) and the inside surface of the bottom layer of the base (32) are disposed in facing relation and are disposed in contact with each other when the base (32) is deflated. The inside surface of the top layer and the inside surface of the bottom layer have high coefficient friction surfaces such that engagement of the surfaces prevents the top layer of the base (32) from sliding relative to the bottom layer of the base (32).

In another aspect, the pad (23) comprises a polyurethane foam.

In another aspect the pad (23) is permanently affixed to the base (32).

In yet another aspect of the invention, the pad (23) is removably attached to the base (32).

Another aspect of the invention is that the pad (23) comprises a polyurethane foam having 1.8-6 PCF density with a 24-45 ILD (indentation load deflection).

In yet another aspect, the pad (23) comprises a pneumatic foam.

In another embodiment, the present invention provides an apparatus (20) for positioning a patient in a gravity dependent surgical position on a surgical table. The apparatus (20) comprises a high coefficient friction pneumatic foam pad (23) having a top surface (26) and a bottom surface (29).

An inflatable base (32) has a top surface (33) and a bottom surface (34), the top surface (33) is disposed beneath and supports the bottom surface (29) of the foam pad (23). The bottom surface (34) has one or more low coefficient friction areas and has one or more high coefficient friction areas disposed thereon. The base (32) has one or more chambers (90)-(99) capable of being disposed in fluid communication with a source of fluid for inflating the base (32). Inflation of the one or more chambers (90)-(99) causes the low coefficient friction areas (100) to contact the surgical table and deflation of the base (32) causes the low coefficient friction areas (100) to be removed from contact with the surgical table and causes the high coefficient friction areas (71)-(86) to contact the surgical table.

One or more baffles (102)-(117) are disposed in fluid communication with the one or more chambers (90)-(99).

One or more inflation ports (41, 44) on the apparatus (20) are disposed in fluid communication with the source of fluid for inflating the base (32).

A plurality of handles (35*a-d*) and (36*a-d*) extend laterally from opposite sides (65, 68) of the apparatus (20).

One or more straps (38*a*, 38*b*) extending laterally from opposite sides (65, 68) of the apparatus (20).

In another aspect of the invention the chambers (90)-(99) are disposed around the periphery of the apparatus (20).

In another aspect of the invention, the base (32) further comprises a top layer of material having an outside surface (33) facing outward and an inside surface facing inward and downward toward the surgical table.

In yet another aspect, the base (32) further comprises a bottom layer of material having an outside surface (34) facing the surgical table and an inside surface facing upward toward the top layer.

Another aspect of the invention is that the inside surface of the top layer of the base (32) and the inside surface of the bottom layer of the base (32) are disposed in facing relation and are disposed in contact with each other when the base (32) is deflated. The inside surface of the top layer and the inside surface of the bottom layer have high coefficient friction surfaces such that engagement of the surfaces prevents the top layer of the base (32) from sliding relative to the bottom layer of the base (32).

In another aspect of the invention, the pad (23) comprises a polyurethane foam.

In yet another aspect of the invention, the pad (23) comprises a polyurethane foam having 1.8-6 PCF density with a 24-45 ILD (indentation load deflection).

A further embodiment of the invention provides an apparatus (20) for positioning a patient in a gravity dependent surgical position on a surgical table. The apparatus (20) comprises a high coefficient friction foam pad (23) having a top surface (26) and a bottom surface (29).

An inflatable base (32) has a top surface (33) and a bottom surface (34). The top surface (33) is disposed beneath and supports the bottom surface (29) of the foam pad (23). The bottom surface (34) of the base (32) has one or more low coefficient friction areas and has one or more high coefficient friction areas disposed thereon. The base (32) has one or more chambers (90-99) capable of being disposed in fluid communication with a source of fluid for inflating the base (32). Inflation of the one or more chambers (90-99) causes the low coefficient friction areas to contact the surgical table and deflation of the base causes the low coefficient friction areas to be removed from contact with the surgical table and causes the high coefficient friction areas to contact the surgical table.

In another aspect of the invention, a first flexible wing (200) extends from the first side (65) of the apparatus (20). The first flexible wing (200) has a top surface (203) and a bottom surface (206). The bottom surface (206) has one of a hook and loop fastening material (209) disposed thereon.

A second flexible wing (212) extends from the first side (65) of the apparatus (20), The second flexible wing (212) has a top surface (215) and a bottom surface (218). The bottom surface (218) has one of a hook and loop fastening material (221) disposed thereon.

The first and second flexible wings (200, 212) are configured such that the second flexible wing (212) is capable of being wrapped upward around the arm of the patient to expose the one of a hook and loop fastening material (221) on its bottom surface (218). The first flexible wing (200) is capable of being wrapped over the second flexible wing (212) such that the one of a hook and loop fastening material (209) on the bottom surface (206) of the first flexible wing (200) engages with the one of a hook and loop fastening material (221) on the bottom surface of the second flexible wing (212).

DESCRIPTION OF THE PREFERRED EMBODIMENTS

Figure 1:
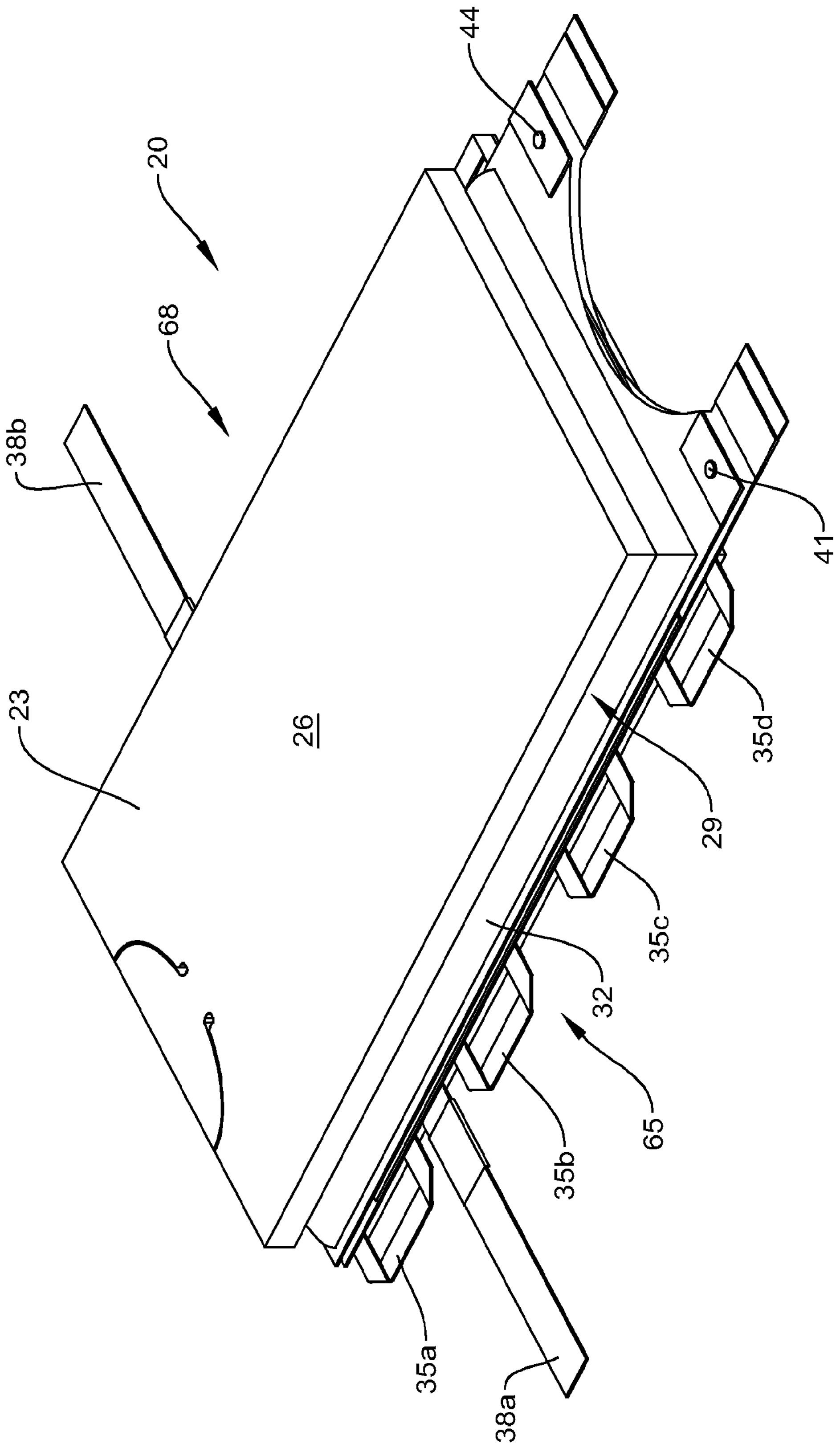
FIG. 1 is a perspective view of one embodiment of the apparatus of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and initially to FIG. 1 thereof, one embodiment of the present invention provides an apparatus 20 for moving a patient before, during, and after a surgical procedure on a surgical table in a surgical theater. The apparatus 20 may be provided with a high coefficient friction pad 23 having a top surface 26 and a bottom surface 29 disposed opposite from the top surface 26. The pad 23 provides a support surface for a patient. The pad 23 may be constructed of a polyurethane foam commonly referred to as a pneumatic foam. A fast recovery, compressible and resilient foam provides a high degree of traction and support for the patient during gravity dependent positions on the surgical table.

The pad 23 of the present invention may comprise a pneumatic foam that is a foam that remains flexible at low temperatures in contrast to memory foam. The foam remains flexible at low temperatures because of its conventional foam chemistry (non-viscoelastic). The foam improves pressure reduction in cooler environments like the operating room and can function without efficacy loss across a temperature gradient of 0 to 100 degrees F. The foam may comprise a polyurethane foam with the following ingredients: polyether, polyol MDI, water, silicone, surfactant, amine, catalyst blue and pigment. The pneumatic foam may comprise a polyurethane foam available by product number HRJZ12250BUM from Rogers Foam Corporation in Somerville, MA. The foam may have a density of 2.35-2.65 pounds per cubic foot (PCF). The foam may have a 25% IFD (15×15×9) of 12-17. Additional properties may include: Tensile psl=6 (min.); Elongation %=120 (min); Tear, ppi=0.5 (min); Comfort factor=1.6 (min); Hysteresis %=25 (max); and ball rebound 20-25%.

Figure 2:
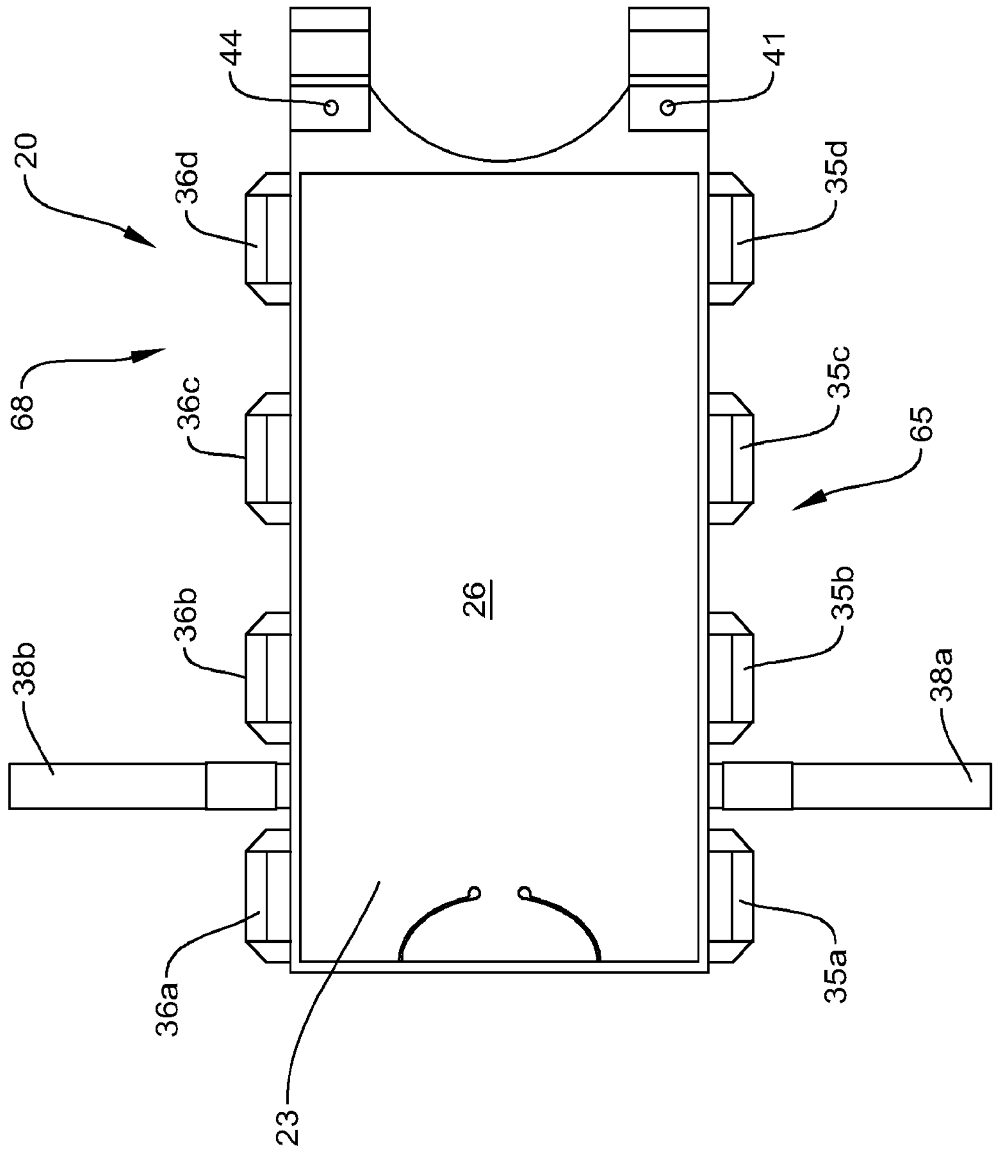
FIG. 2 is a top plan view of the apparatus shown in FIG. 1.
Figure 3:
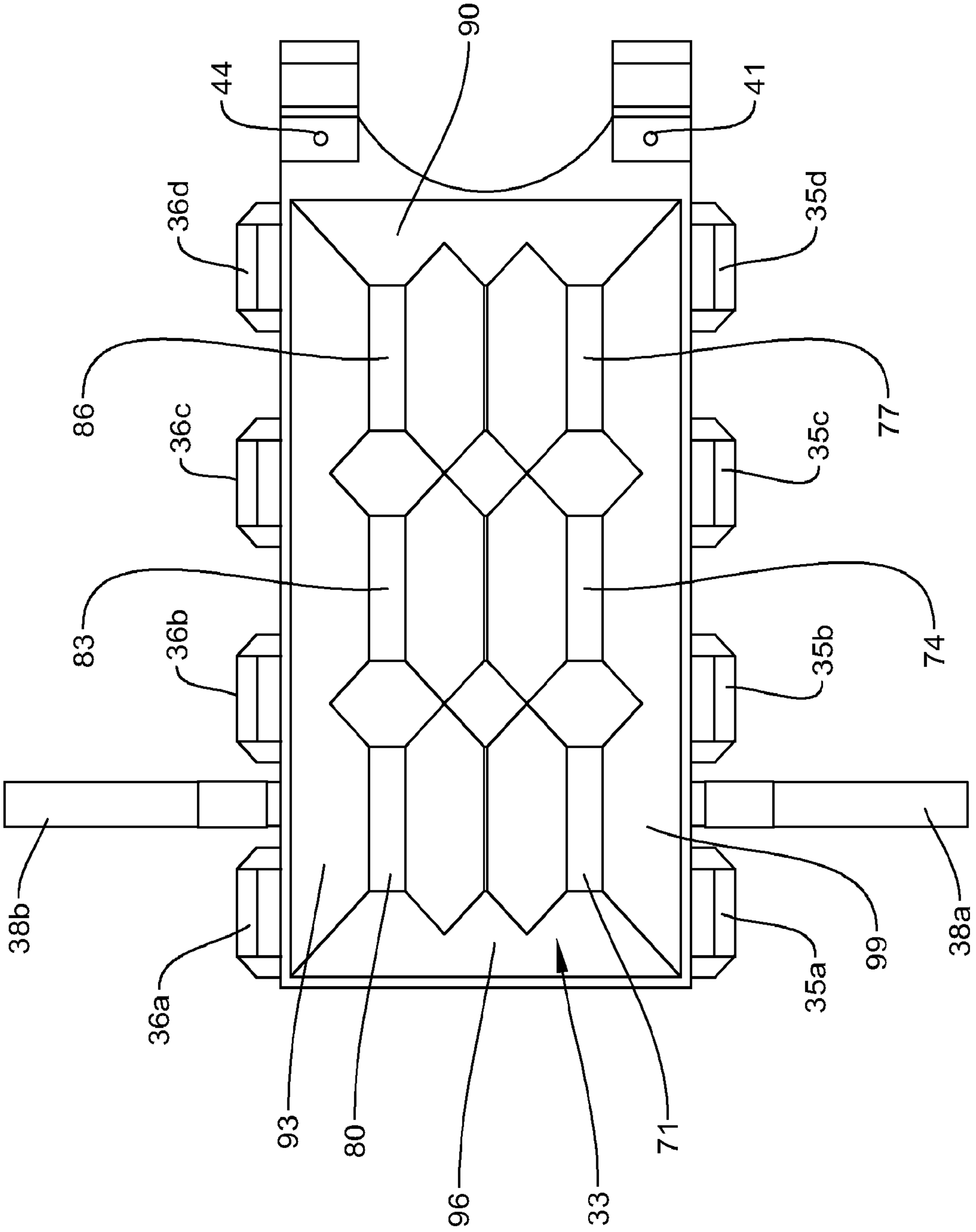
FIG. 3 is a top plan view of the base of the apparatus.

The bottom surface 29 of the pad 23 is disposed above and supported by a base 32 (FIG. 3). As shown in FIG. 1, the pad 23 may be disposed directly on the base 32 with no layers in between. The apparatus 20 may be provided with a plurality of handles 35*a-d* and 36*a-d* (FIG. 2) extending from opposite sides 65, 68 of the apparatus 20. The apparatus 20 may also be provided with one or more lateral straps 38*a*, 38*b* that may be used for securing the apparatus 20 in position on the surgical table, for example, by attaching the lateral straps 38*a*, 38*b* to the rails of the surgical table.

Figure 4:
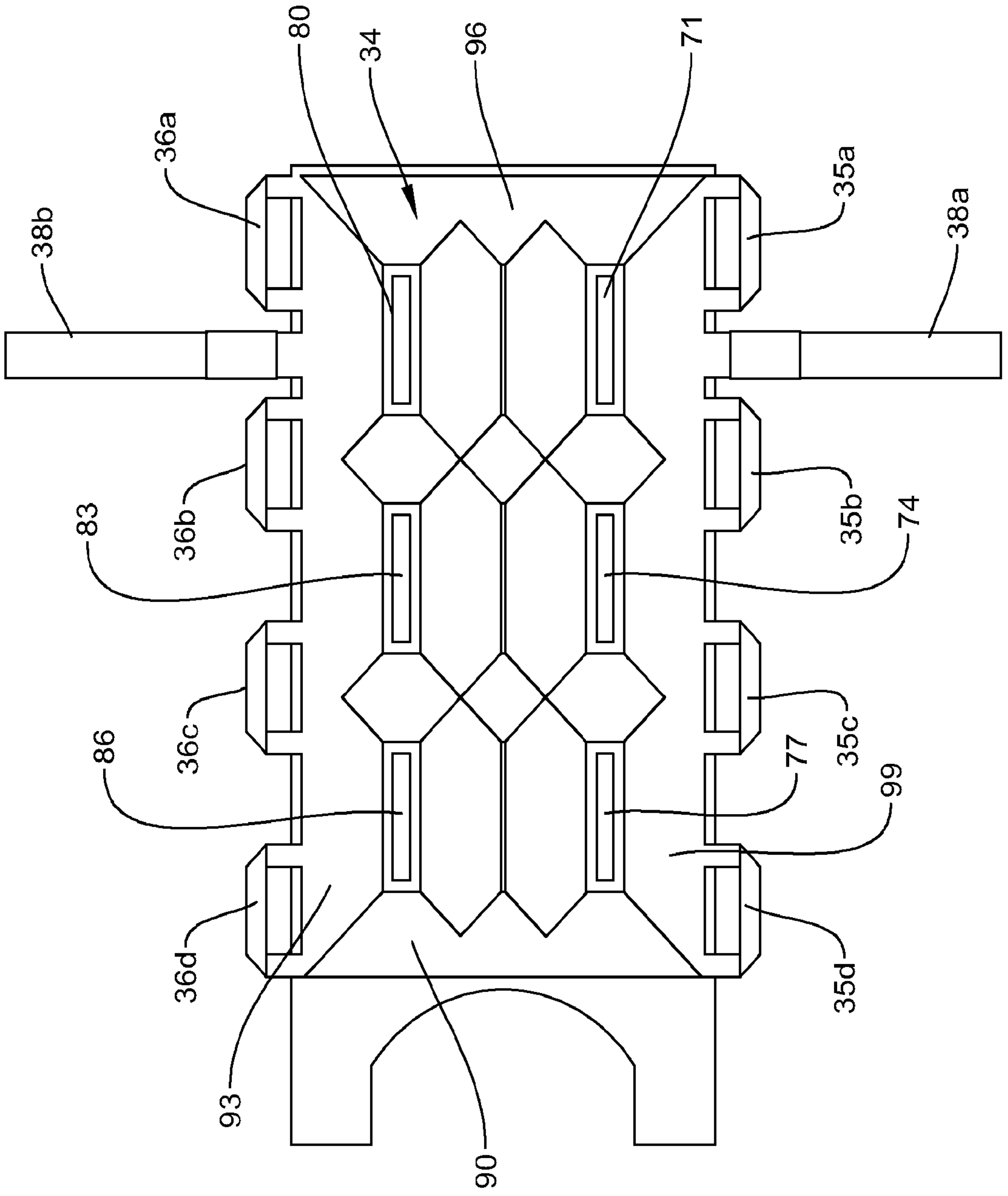
FIG. 4 is a bottom plan view of the base of the apparatus in the deflated state.
Figure 5:
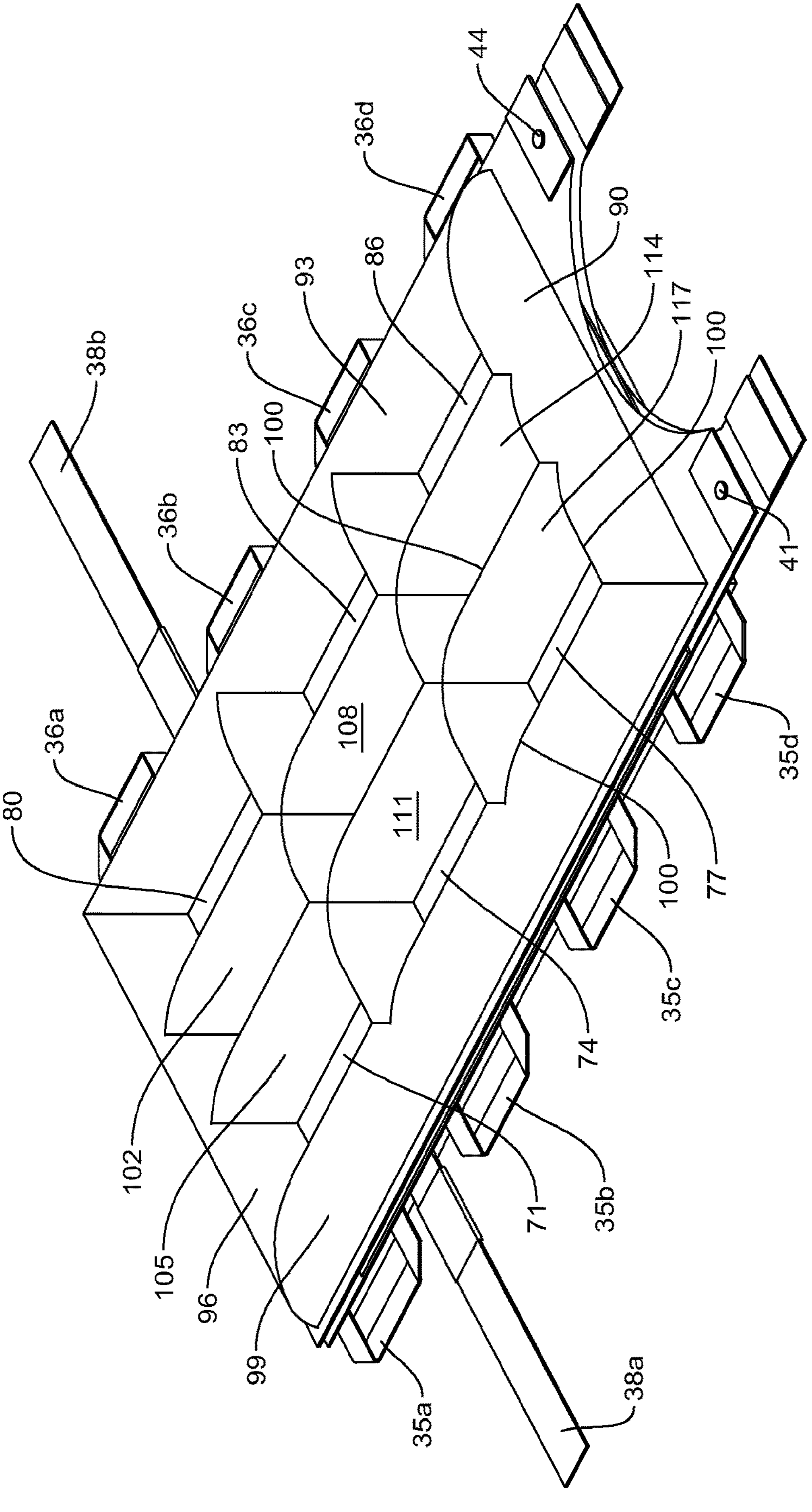
FIG. 5 is a top perspective view of the base in the inflated state.
Figure 6:
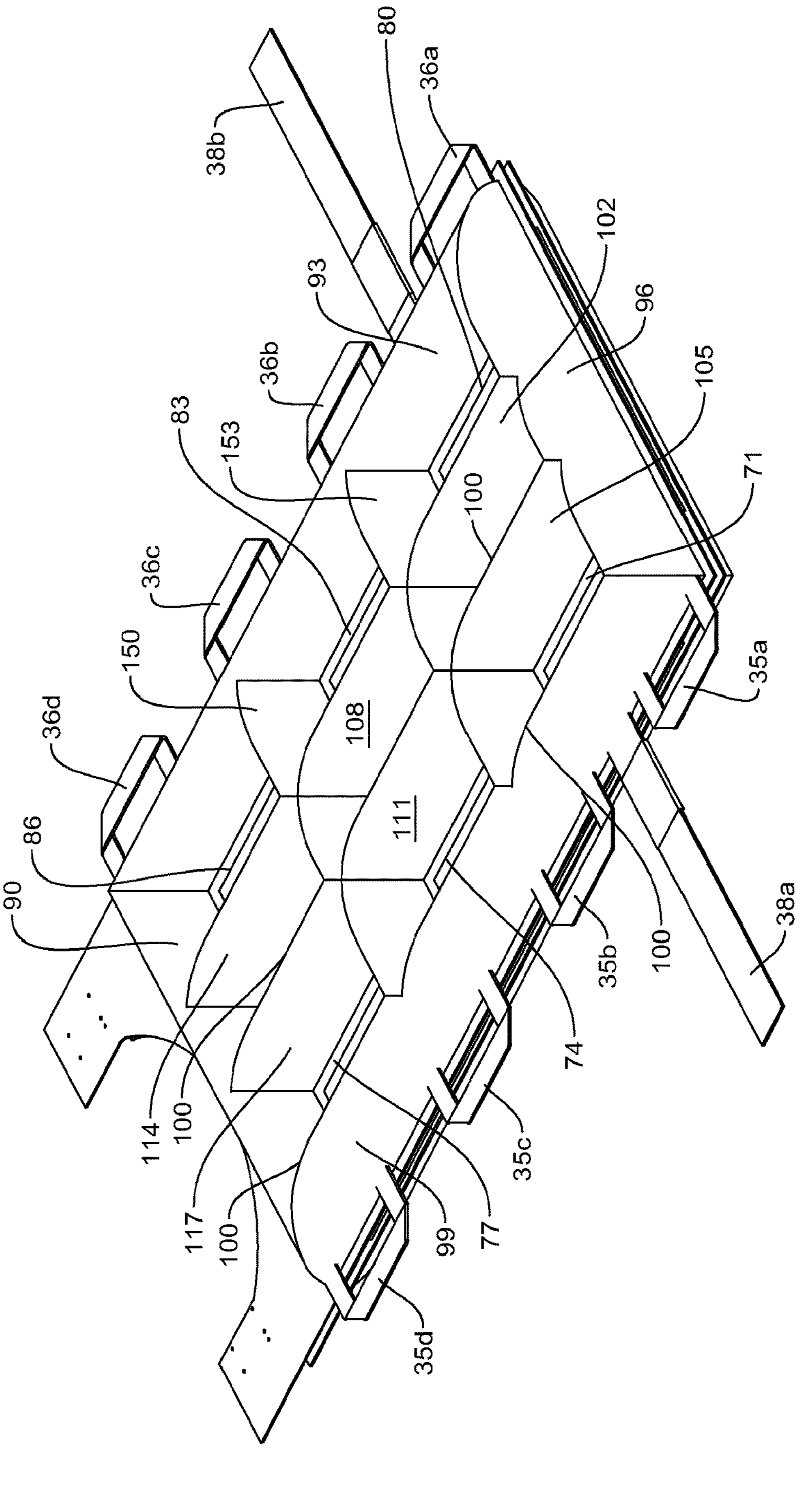
FIG. 6 is a bottom perspective view of the base in the inflated state.
Figure 7:
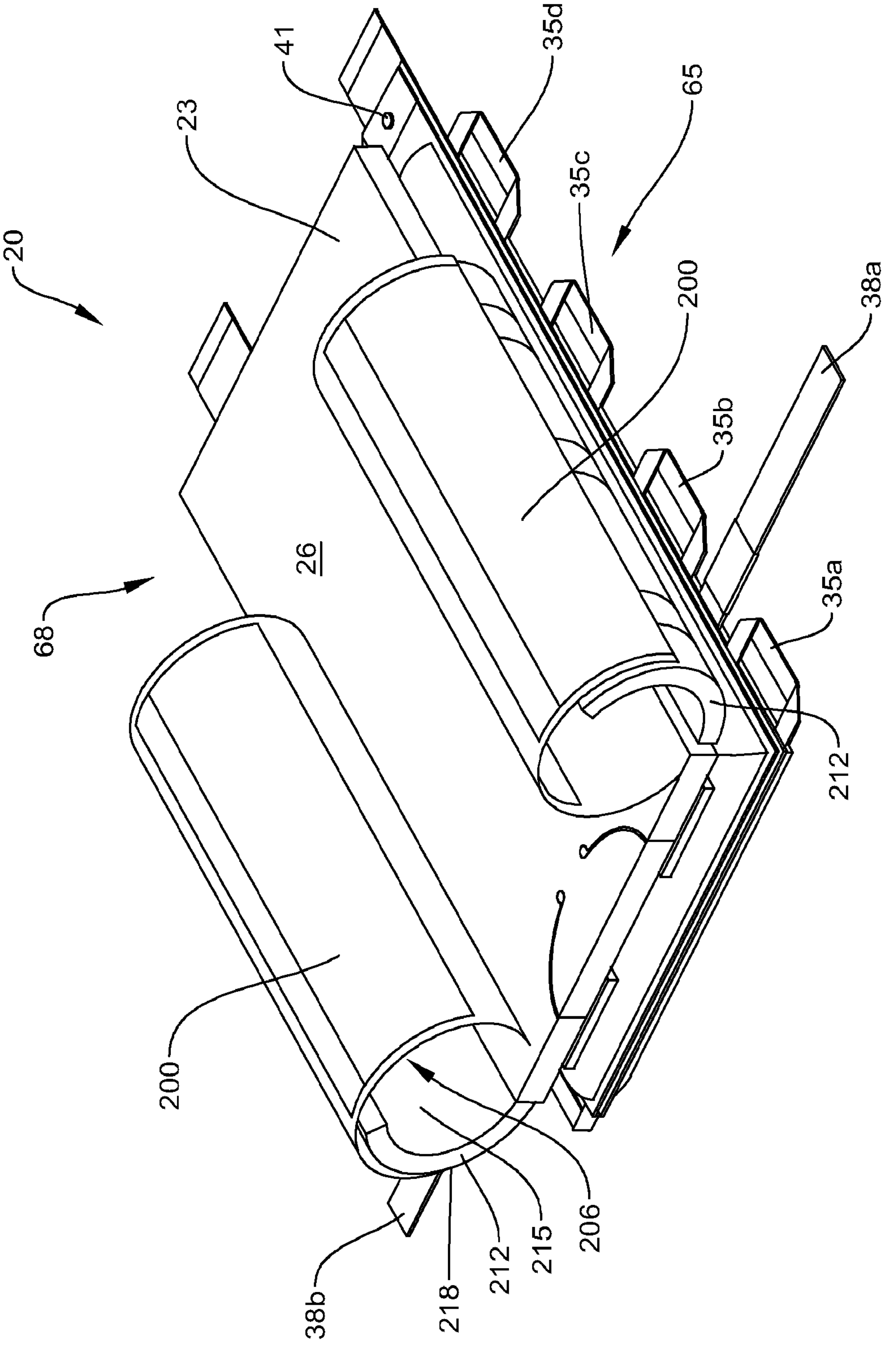
FIG. 7 is a perspective view of another embodiment of the invention with arm adduction.
Figure 8:
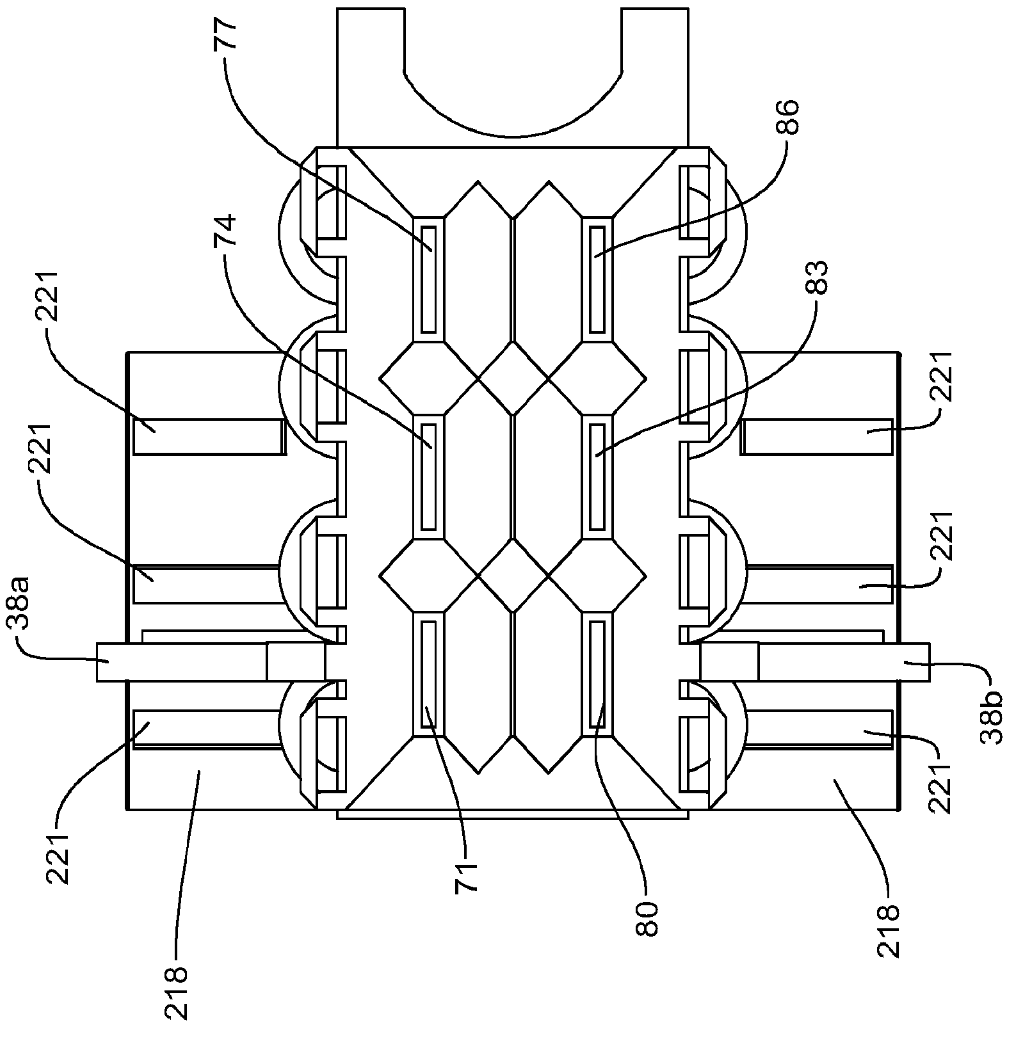
FIG. 8 is bottom plan view of the embodiment shown in FIG. 7.
Figure 9:
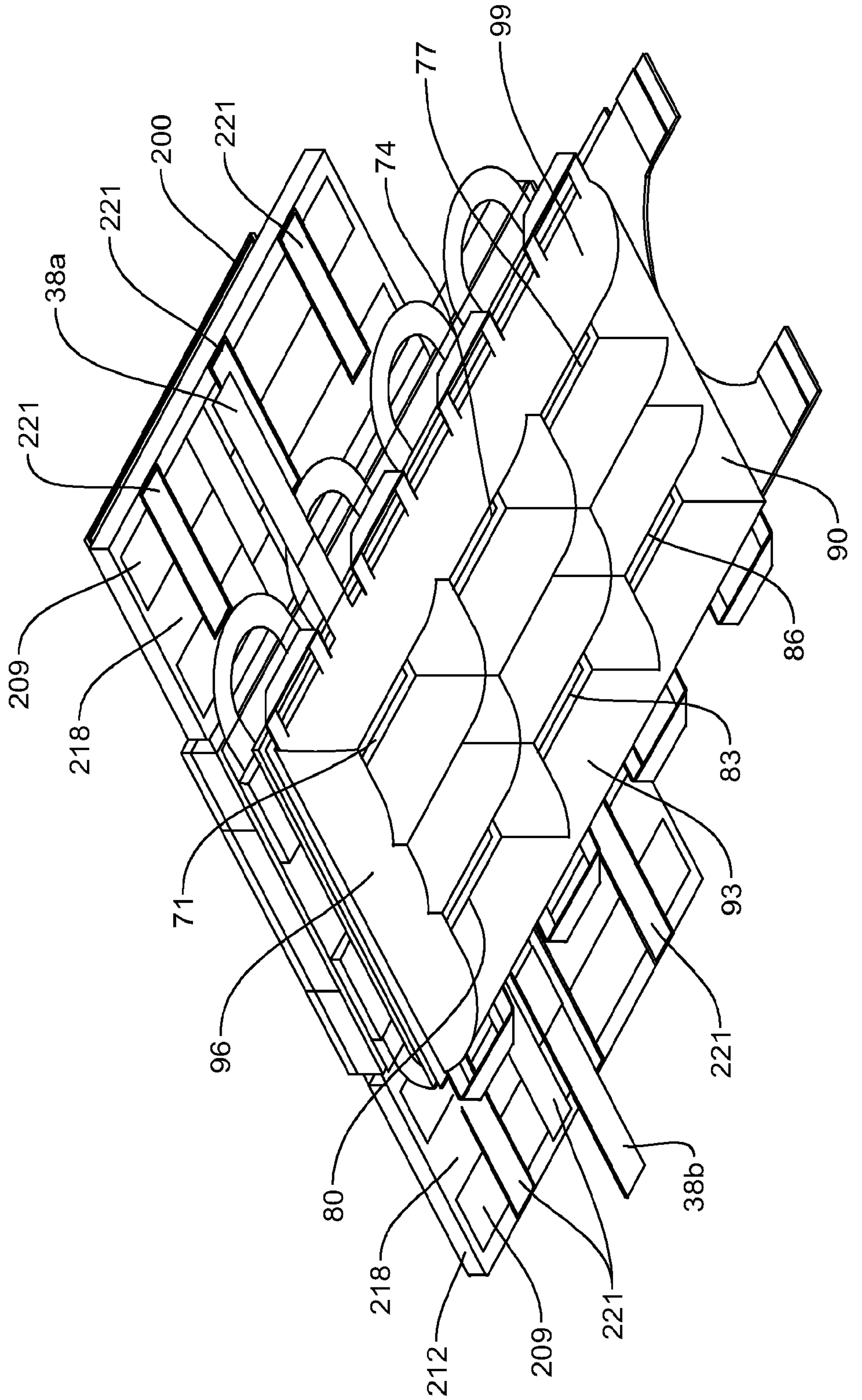
FIG. 9 is a bottom perspective view of the embodiment shown in FIG. 7 in an inflated state.
Figure 10:
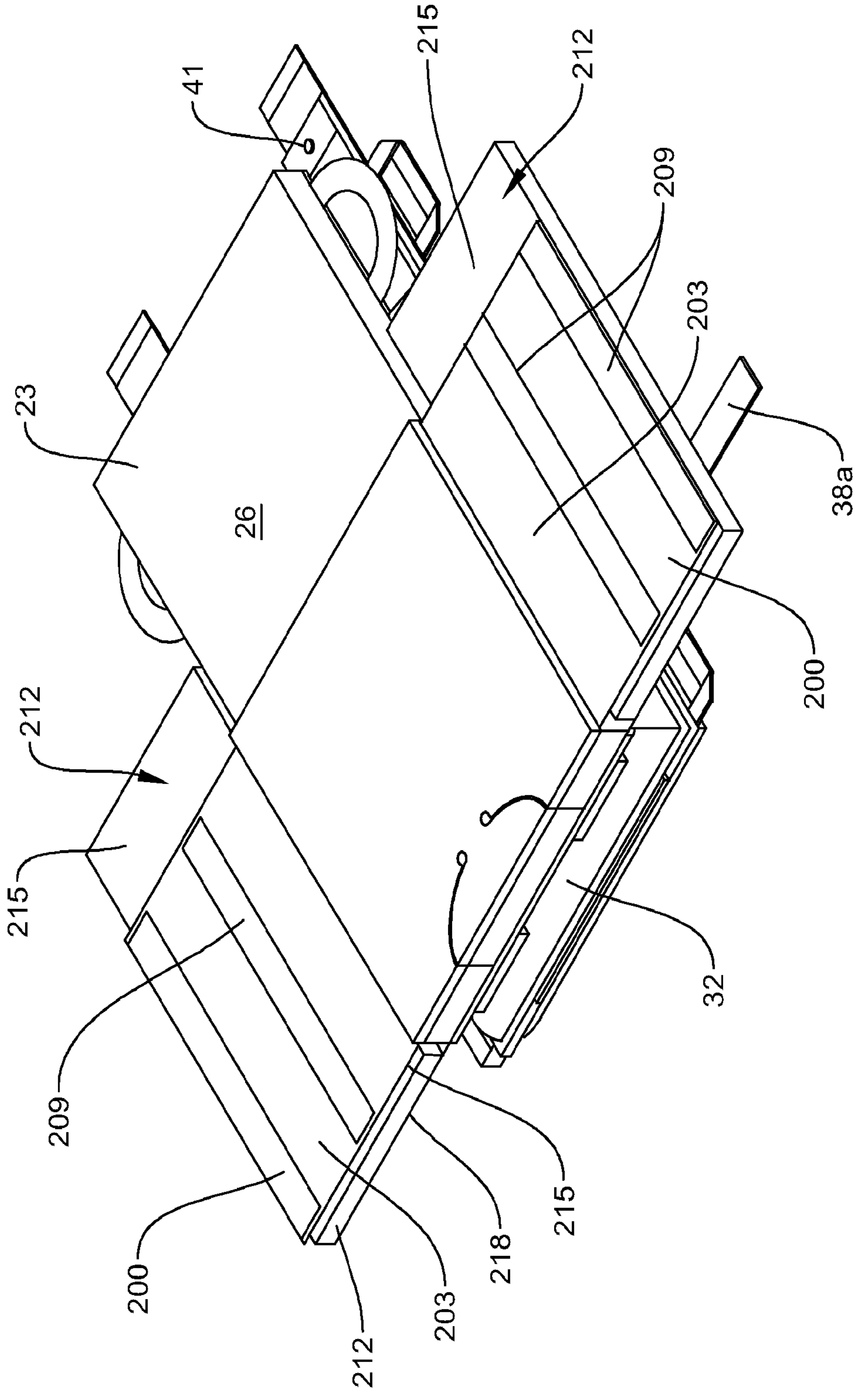
FIG. 10 is another top perspective view of the embodiment shown in FIG. 7.

The base 32 may be made of a sturdy, flexible material. The material may be a nonwoven layered material such as SMS (spun-melt-spun), similar celluloid material, or the like. The handles 35*a*-*d* and 36*a*-*d* may be formed by loops of material attached to the sides 65, 68 of the base 32. The handles 35*a*-*d* and 36*a*-*d* are sized to receive the hand of a provider such that a provider on each side of the device can grasp the handles 35*a*-*d* or the handles 36*a*-*d* with their hands in order to move the base 32 along the length of the surgical table to position or re-position the patient as necessary during a surgical procedure. Alternatively, two providers on each side can each grab a pair of handles to move heavier patients. The base 32 has a top surface 33 (FIG. 3) and a bottom surface 34 (FIG. 4).

The base 32 may be provided with a reinforcing substrate sheet (not shown) to provide additional structural support for the pad 23. The reinforcing substrate sheet may be constructed of a condensed foam or biodegradable cardboard piece that may be inserted between layers of the material that comprise the base 32.

The apparatus 20 with a pneumatic foam pad 23 is preferable to foam by itself because the extra support provided by the combination of the base 32 and the foam pad 23 prevents the foam from bunching up under the patient when lifting and/or repositioning the patient. It also allows the provider to pull back in case the patient was not positioned correctly. The apparatus 20 provides structure so that the foam pad 23 does not elongate, tear, or create laxity during movement or positioning of the patient in gravity dependent positions.

A pair of inlet ports 41, 44 may be provided at one end of the apparatus 20. The ports 41, and 44 may have a valve disposed thereon for connecting to a fluid source such that the fluid is in communication with a chambers 90, 93, 96, and 99 and a network of baffles 102, 105, 108, 111, 114, and 117, defined in the base 32. The inflation and deflation of the chambers 90-99 and baffles 102-108 are described in greater detail herein. The fluid may be used for inflating and deflating portions of the base for heating and pressure management purposes or for moving the patient on the surgical table.

In one embodiment, the present invention allows the user to move both pad 23 and patient simultaneously, allowing them to always be placed at the top of the surgical table for airway management, and then easily moved to lithotomy via manual lifting and sliding or via a lifting apparatus.

The present invention may have reinforced structural material with low friction and high enough strength needed to reduce the impact of sheer forces or sliding in the event a low friction material is under the pad. This allows the current design to be used with a typical "hover device". The current embodiments mechanical anchors would be placed within the hover products existing handle structure and to the surgical tables bedrail, mattress or table itself, thus allowing the existing moveable pad lift system to serve the structural utility needed to reduce the impact of sheer forces from sliding.

Turning to FIGS. 3-6, underneath the pad 23, the base 32 may be provided with recessed high coefficient friction material areas 71, 74, 77, 80, 83 and 86 that move away from engagement with the surgical table when the base 32 is inflated to move a patient. When the base 32 is inflated, chambers 90, 93, 96, 99 and baffles 102, 105, 108, 11, 114, and 117 are inflated such that low coefficient friction areas covering the chambers 90-99 and baffles 102-117 extend outward and come into contact with the surgical table to provide for sliding and movement due to the low coefficient friction surfaces. Additional baffles 150, 153 (FIG. 6) may extend substantially perpendicular to the remaining baffles. When the base 32 is deflated, the high coefficient friction areas 71-86 reengage with the table and dramatically reduce traditional general low friction potential for sliding.

In use, while the base 32 is inflated the friction is reduced to the point of being able to slide patient. When the base 32 is inflated, the surfaces 71-86 that make contact with the surgical table that act as high friction brakes are lifted off and disengage with the surgical mat/mattress/table top.

While the base 32 is deflated, the friction surfaces 71-86 on the bottom of the apparatus 20 re-engage with the surgical mat/mattress/table tap and prevent the apparatus 20 from sliding.

While the base 32 is deflated, friction surfaces within the base 32 prevent the top fabric surface 33 that makes contact with the patient from sliding relative to the bottom fabric surface 34 that makes contact with the surgical table top. As a result, the slack created by the top and bottom fabric surface is prevented from sliding in relation to each other as they are 'stuck' together until inflation.

This interior friction surface prevents the patient from sliding with the top fabric of the apparatus 20 once the apparatus 20 is deflated and fixed into position and the table top is tilted/inclined in any direction. After deflating, the apparatus 20 is locked into place on the surgical table and the patient is prevented from sliding any further due to the interior high friction surfaces.

Another embodiment of the invention allows controlled selective inflation using ambient air or other gas (such as but not limited to Nitrogen (N2), clean dry air (CDA), Oxygen (02), Carbon Dioxide (CO2), etc.) or fluid conveyed to desired sections/areas of the apparatus 20 needed to reduce pressure perioperatively to reduce tissue injury potential. This inflation pressure would be set low enough to manipulate tissue forces between the patient and the surgical table without impacting the surgical field or internal areas of surgical care and exposure.

Another embodiment allows for air or other fluid to cool or warm the patient via separate ports to any matter of internal bladders placed within the apparatus 20. This configuration allows for patient cooling or warming that would support the surgical procedure.

The present invention may also provide a combined utility of patient transfer and patient tissue injury reduction, while selectively reducing or increasing the required force to lift or slide a patient as desired.

The foam pad 23 may be attached to the base 32 by pressure sensitive adhesive or spray adhesives or any other attachment method as will be evident to those of ordinary skill in the art based on this disclosure. A high friction polyurethane or pneumatic foam pad 23 may be joined to the nonwoven base 32 via spray adhesive or pressure sensitive adhesive. All of the adhesives are FDA approved.

The present invention provides a combined element allowing the user to select desired high friction or low friction function of the bottom surface of the inflatable pad for use in facilitating ease of lifting/sliding a patient during positioning or affixing the patient in place during a gravity dependent positioning tilt of the surgical table. This combination allows for control of patient positioning needed to move a patient from stretcher to table, and inter-station changes on the surgical table needed for anesthesia airway access or lithotomy.

The present invention provides a combined element of a modular high friction material system with a reusable inflatable transfer device where the upper modular pad has a series of drapes needed to preserve the cleanliness of the underlying inflatable device so staff can use after surgery to transfer the patient back to the stretcher. The upper pad may be removable by rolling the patient with the pad's handles back and forth to remove the pad, then placing patient supine on the underlying inflatable product to transfer to the stretcher.

Another advantage of the present invention is that it provides a combined element of an integrated or removable upper modular patient support pad and an inflatable transfer device with a series of inner bladder chambers or baffles that allows selective air flow needed to minutely change the patient's pressure interaction with the surgical table, thus reducing pressure injury potential.

Yet another advantage of the invention is that it provides a combined or separate element of an inflatable patient transfer device that can be used as an intermittent pressure management utility device under patients not undergoing gravity dependent or omnidirectional bed rotation, or when the patient is supine using ambient air or other gas (such as but not limited to Nitrogen (N2), clean dry air (CDA), Oxygen (O2), Carbon Dioxide (CO2), etc.) or liquid of desired sections/areas of the device needed to reduce pressure perioperatively needed to reduce tissue injury potential.

Also, the invention provides a combined or separate element of an inflatable transfer patient device that is used to warm or cool the patient during surgery.

Turning to FIGS. 7-10, a first flexible wing 200 may extend from the first side 65 of the apparatus 20. The first flexible wing 200 has a top surface 203 (FIG. 10) and a bottom surface 206. The bottom surface 206 may be provided with one of a hook and loop fastening material 209. The hook and loop fastening material 209 may be disposed in strips attached to the bottom surface 206. A second flexible wing 212 also may extend from the first side 65 of the apparatus 20. The second flexible wing 212 has a top surface 215 and a bottom surface 218. The bottom surface 215 may be provided with one of a hook and loop fastening material 221. The one of hook and loop fastening material 209 is configured to engage with the one of a hook and loop fastening material 221.

The first and second flexible wings 200, 212 are configured such that the second flexible wing 212 is capable of being wrapped upward around the arm of the patient to expose the one of a hook and loop fastening material 221 on its bottom surface 218. The first flexible wing 200 is capable of being wrapped over the second flexible wing 212 such that the one of a hook and loop fastening material 209 on the bottom surface 206 of the first flexible wing 200 engages with the one of a hook and loop fastening material 221 on the bottom surface 218 of the second flexible wing 212. First and second flexible wings 200, 212 may also extend from the opposite side 68 of the apparatus.

The present invention contemplates that many changes and modifications may be made. Therefore, while the presently-preferred form of the inflatable Trendelenburg and pressure management apparatus has been shown and described, and several modifications and alternatives discussed, persons skilled in this art will readily appreciate that various additional changes and modifications may be made without departing from the spirit of the invention, as defined and differentiated by the following claims.

What is claimed is:

1. An apparatus for positioning a patient in a gravity dependent surgical position on a surgical table, the apparatus comprising:

a high coefficient friction foam pad having a top surface and a bottom surface;

an inflatable base, the base having a top surface and a bottom surface, the top surface disposed beneath and supporting the bottom surface of the foam pad, the bottom surface of the base having one or more low coefficient friction areas and having one or more high coefficient friction areas disposed thereon, the base having one or more chambers capable of being disposed in fluid communication with a source of fluid for inflating the base, wherein inflation of the one or more chambers causes the low coefficient friction areas to contact the surgical table and causes the high coefficient of friction areas to be removed from contact with the surgical table and deflation of the base causes the high coefficient friction areas to contact the surgical table;

a plurality of handles extending laterally from opposite sides of the apparatus; and, one or more straps extending laterally from opposite sides of the apparatus.

2. The apparatus of claim 1, further comprising one or more inflatable baffles in fluid communication with the chambers.

3. The apparatus of claim 1, wherein the chambers are disposed around the periphery of the apparatus.

4. The apparatus of claim 1, wherein the base further comprises a top layer of material having an outside surface facing outward and an inside surface facing inward and downward toward the surgical table.

5. The apparatus of claim 4, wherein the base further comprises a bottom layer of material having an outside surface facing the surgical table and an inside surface facing upward toward the top layer.

6. The apparatus of claim 5, wherein the inside surface of the top layer of the base and the inside surface of the bottom layer of the base are disposed in facing relation and are disposed in contact with each other when the base is deflated, the inside surface of the top layer and the inside surface of the bottom layer having high coefficient friction surfaces such that engagement of the surfaces prevents the top layer of the base from sliding relative to the bottom layer of the base.

7. The apparatus of claim 1, wherein the pad comprises a polyurethane foam.

8. The apparatus of claim 1, further comprising at least one port disposed in fluid communication with a bladder disposed within the apparatus, the bladder configured to receive a cooling or warming fluid.

9. The apparatus of claim 1, wherein the pad comprises a pneumatic foam.

10. The apparatus of claim 1, wherein the pad is permanently affixed to the base.

11. The apparatus of claim 1, wherein the pad is removably attached to the base.

12. An apparatus for positioning a patient in a gravity dependent surgical position on a surgical table, the apparatus comprising:

a high coefficient friction pneumatic foam pad having a top surface and a bottom surface;

an inflatable base, the base having a top surface and a bottom surface, the top surface disposed beneath and supporting the bottom surface of the foam pad, the bottom surface having one or more low coefficient friction areas and having one or more high coefficient friction areas disposed thereon, the base having one or more chambers capable of being disposed in fluid communication with a source of fluid for inflating the base, wherein inflation of the one or more chambers causes the low coefficient friction areas to contact the surgical table and causes the high coefficient of friction areas to be removed from contact with the surgical table and deflation of the base causes the high coefficient friction areas to contact the surgical table;

one or more baffles disposed in fluid communication with the one or more chambers;

one or more inflation ports on the apparatus disposed in fluid communication with the source of fluid for inflating the base;

a plurality of handles extending laterally from opposite sides of the apparatus; and, one or more straps extending laterally from opposite sides of the apparatus.

13. The apparatus of claim 12, wherein the chambers are disposed around the periphery of the apparatus.

14. The apparatus of claim 12, wherein the base further comprises a top layer of material having an outside surface facing outward and an inside surface facing inward and downward toward the surgical table.

15. The apparatus of claim 14, wherein the base further comprises a bottom layer of material having an outside surface facing the surgical table and an inside surface facing upward toward the top layer.

16. The apparatus of claim 15, wherein the inside surface of the top layer of the base and the inside surface of the bottom layer of the base are disposed in facing relation and are disposed in contact with each other when the base is deflated, the inside surface of the top layer and the inside surface of the bottom layer having high coefficient friction surfaces such that engagement of the surfaces prevents the top layer of the base from sliding relative to the bottom layer of the base.

17. The apparatus of claim 12, wherein the pad comprises a polyurethane foam.

18. The apparatus of claim 12, further comprising at least one port disposed in fluid communication with a bladder disposed within the apparatus, the bladder configured to receive a cooling or warming fluid.

19. An apparatus for positioning a patient in a gravity dependent surgical position on a surgical table, the apparatus comprising:

a high coefficient friction foam pad having a top surface and a bottom surface;

an inflatable base, the base having a top surface and a bottom surface, the top surface disposed beneath and supporting the bottom surface of the foam pad, the bottom surface of the base having one or more low coefficient friction areas and having one or more high coefficient friction areas disposed thereon, the base having one or more chambers capable of being disposed in fluid communication with a source of fluid for inflating the base, wherein inflation of the one or more chambers causes the low coefficient friction areas to contact the surgical table and causes the high coefficient of friction areas to be removed from contact with the surgical table and deflation of the base causes the high coefficient friction areas to contact the surgical table.

20. The apparatus of claim 19, further comprising:

a first flexible wing extending from a first side of the apparatus, the first flexible wing having a top surface and a bottom surface, the bottom surface having one of a hook and loop fastening material disposed thereon, a second flexible wing extending from the first side of the apparatus, the second flexible wing having a top surface and a bottom surface, the bottom surface having one of a hook and loop fastening material disposed thereon, wherein the first and second flexible wings are configured such that the second flexible wing is capable of being wrapped upward around the arm of the patient to expose the one of a hook and loop fastening material on its bottom surface and the first flexible wing is capable of being wrapped over the second flexible wing such that the one of a hook and loop fastening material on the bottom surface of the first flexible wing engages with the one of a hook and loop fastening material on the bottom surface of the second flexible wing.

* * * * *